F. A. G. PAPE.
METHOD AND MACHINE FOR CRACKING NUTS.
APPLICATION FILED JUNE 13, 1919.
1,342,689.
Patented June 8, 1920.
2 SHEETS—SHEET 1.
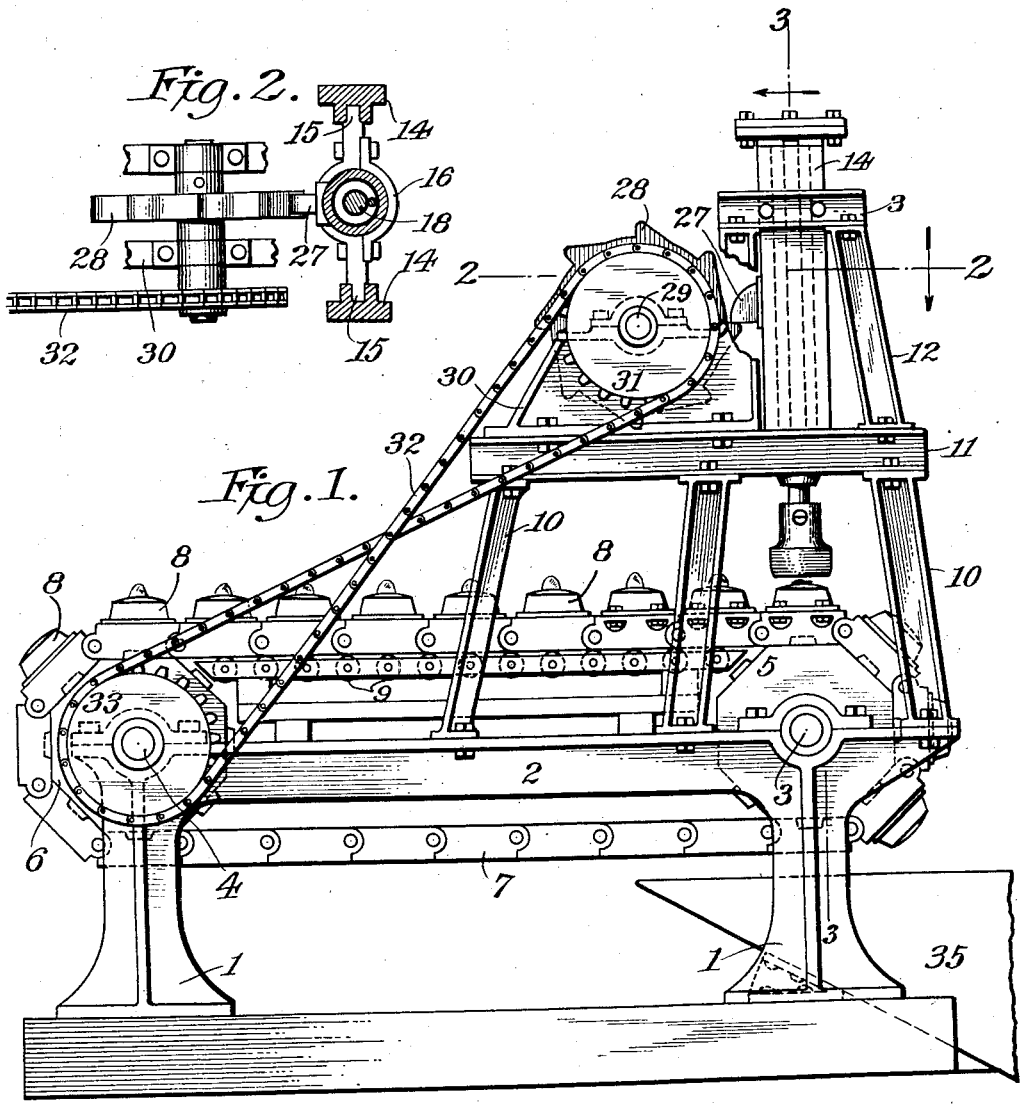
Frederic A. G. Pape Inventor
By his Attorneys
Pennie Davis Marvin & Edmonds

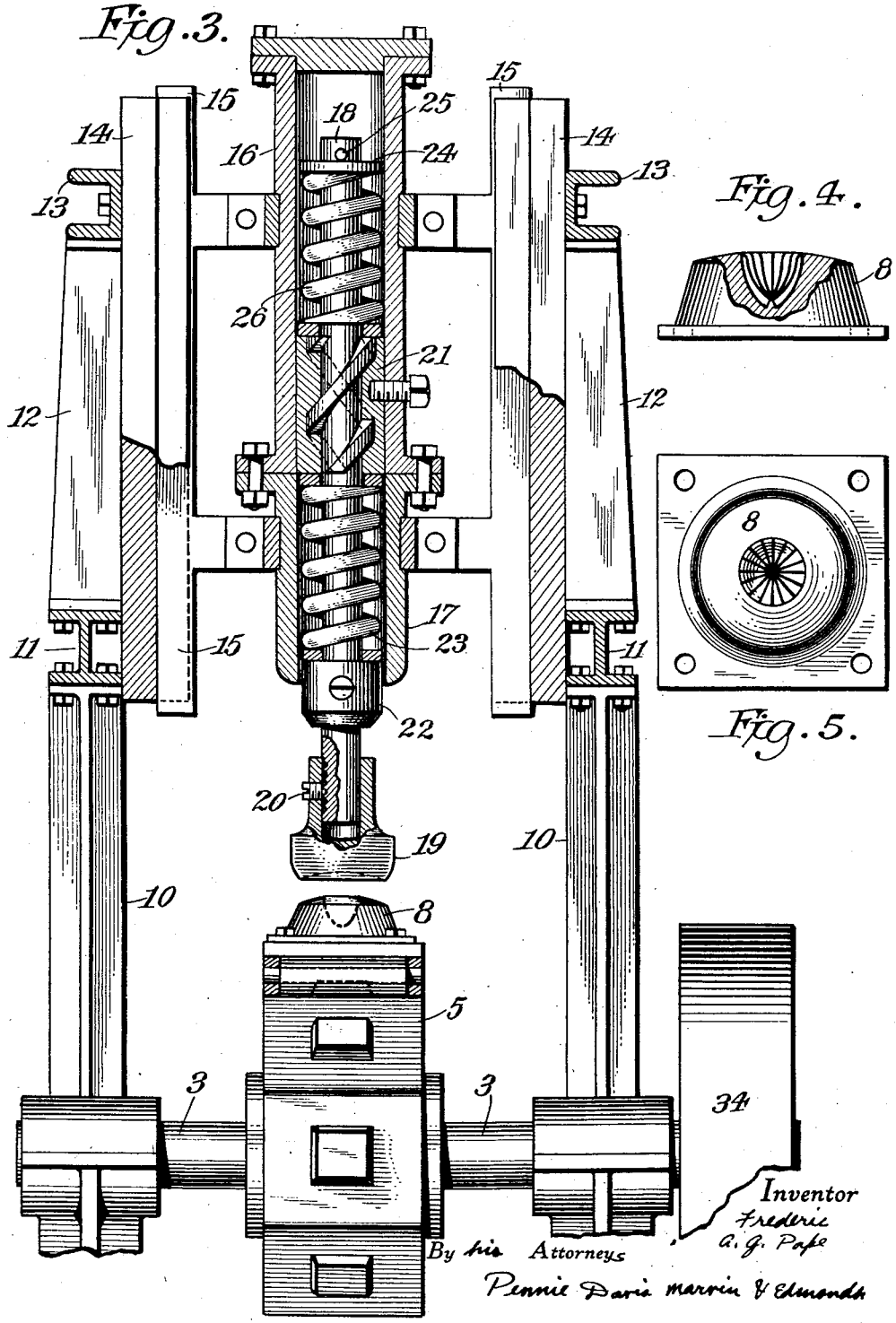

UNITED STATES PATENT OFFICE.

FREDERIC A. G. PAPE, OF NEW YORK, N. Y., ASSIGNOR TO LYMAN N. HINE, OF NEW YORK, N. Y.

METHOD AND MACHINE FOR CRACKING NUTS.

1,342,689.            Specification of Letters Patent.      Patented June 8, 1920.

Application filed June 13, 1919. Serial No. 304,026.

*To all whom it may concern:*

Be it known that I, FREDERIC A. G. PAPE, a subject of Germany, residing at New York city, in the county of New York, State of New York, have invented certain new and useful Improvements in Methods and Machines for Cracking Nuts; and I do hereby declare the following to be a full, clear, and exact description of the invention, such as will enable others skilled in the art to which it appertains to make and use the same.

This invention relates to an improved method and machine for cracking nuts, and more particularly for cracking cohune nuts and like palm nuts, having a thick, hard, stone-like shell. The present invention provides an improved method and apparatus, according to which the nuts can be cracked in a rapid and continuous manner and with a minimum of injury to the nut kernels containing the valuable oil.

The nuts of the *Attalea* and other species of palm trees of the Central and South American tropics are provided with two shells. The outer shell is a pericarp or husk of a fibrous nature and of varying density, and it is impregnated with woody pulp and resinous matter. It varies in thickness up to about one-quarter inch. The inner shell is more than double the thickness of the outer shell, and is of a most obstinate hardness, and somewhat like stone.

The cohune nuts grow by the hundreds in clusters upon a common stalk. An average cluster or bunch may thus weigh more than a hundred pounds, and may be from two and a half to three and a half feet in length; and frequently contains more than five hundred nuts. The nuts vary somewhat in size, but are comparable in size and shape with a duck's egg, although they run out to a fibrous point at the small end. The cohune nuts do not all ripen at the same time, but progressively ripen, both while upon the stalk and after removal therefrom.

The kernels of the cohune nuts are heavily charged with oil and this oil is valuable for edible and other purposes, somewhat resembling cocoanut oil in odor and flavor. The kernels form about one-tenth of the weight of the cohune nuts; that is, from about ten tons of nuts there should be obtained about one ton of kernels. When the nuts are ripe the kernels are loose and are readily removed when the outer shells of the nuts are cracked or otherwise opened. The nature of the shells is, however, such that the cracking operation is difficult, and particularly where the meats or kernels are desired in an uninjured or unbroken condition after the cracking operation. Where the kernels are injured or broken during the cracking operation, they more readily spoil during shipment, and it is more difficult to recover all of the kernel from the shell.

The present invention relates to an improved method and apparatus by which large numbers of the nuts can be cracked rapidly and in a continuous manner and without damage to the kernels containing the oil. The present invention is applicable to nuts of varying sizes and shapes, and whether or not the nuts have been first freed from their outer shell or pericarp, which, if the nuts have been lying around for any considerable time, may become more or less rotten and sticky.

The nuts are, however, preferably and advantageously first subjected to a special treatment for the removal of the outer shell or husk from the hard inner shell prior to the cracking operation of the present invention. In my companion application entitled, "Method and apparatus for removing the outer shell or husk from palm nuts," Serial No. 304,025, filed June 13, 1919, I have described an improved method and apparatus for effecting this preliminary removal of the outer husk or shell so that the nuts will be freed therefrom and made available in a clean state for the cracking operation.

The cracking operation of the present invention involves the continuous and successive supplying of the nuts to a cracking hammer arranged to deliver upon the nuts a blow of a characteristic nature, as hereinafter pointed out. The nut is held rigidly from rotation during the time the blow is received, and the blow is of a rotating or twisting character, adapted not only to crack the outer shell, but to effect the separation of the cracked portions thereof without injury to the inner kernels.

The invention will be further described in connection with the embodiment thereof illustrated in the accompanying drawings, but it is intended and understood that the invention will be illustrated by, but is not limited to, the embodiment thereof thus illustrated and described. In the accompanying drawings, Figure 1 shows a cracking machine embodying the invention and adapted for the practice of the process of the invention, this machine being shown in side elevation.

Fig. 2 is a detail view of part of the machine, taken on the line 2—2 of Fig. 1.

Fig. 3 is an enlarged view of part of the machine, taken on the line 3—3 of Fig. 1.

Fig. 4 is an enlarged view of one of the anvils, with part broken away to show its construction.

Fig. 5 is a top view of one of the anvils, and

Fig. 6 is a bottom view of the hammer head.

The apparatus illustrated is constructed of steel, iron, and other suitable material or metals in self-contained, power driven units, according to the particular local requirements; that is, one or more units may be provided and operated together, depending upon the number of seeds to be subjected to the cracking operation.

The apparatus illustrated has suitable upright supports 1 carrying the bed 2 upon which the shafts 3 and 4 are mounted. Each of these shafts carries a sprocket, the sprocket 5 being carried by the shaft 3 and the sprocket 6 by the shaft 4. These sprockets have eight faces and are made of cast steel or other material of a proper width to support the chain links 7, which form an endless chain or belt and each of which carries thereon a suitable anvil 8. The central portion of the frame is provided with a supporting frame work carrying rollers 9 for supporting the traveling chain and anvils. Part of the anvils have been omitted from the drawing, for simplicity of illustration.

Mounted upon the bed of the machine are upright standards 10, supporting cross beams 11 which carry the frame work or bearing 30, hereinafter referred to, and the uprights 12 having crossbeams 13 at their upper ends. To the cross-beams 11 and 13 there are secured vertical guide members 14, in which the guides 15 of the hammer operate.

The hammer is made up of the cylindrical members 16 and 17, suitably secured together and mounted in the cross-beams to which the guides 15 are secured, and having within them the upper portion of the rod 18 to which the hammer head 19 is secured. The cylindrical member 16 has secured thereto a screw sleeve or bushing 21 with a quick acting screw thread or worm therein in which a corresponding screw thread or worm carried by or mounted on the rod 18 works. Relative movement of the rod and cylindrical members will, therefore, cause a combined relative rotation and longitudinal movement of the rod with respect to the cylindrical member.

The rod 18 carries near its lower end a collar 22, suitably secured thereto. A spring 23 surrounds the rod between this collar and the screw sleeve or bushing 21. The upper end of the rod 18 similarly has a collar or washer 24 held in place from above by the pin 25 and with a spring 26 arranged between this bushing or washer and the upper side of the sleeve or bushing 21. The arrangement of the two springs 23 and 26 is such that the rod 18 is held in a balanced position, and such that, when the relative longitudinal and rotational movements of the rod with respect to the cylinders 16 and 17 takes place, the rod will be returned by the spring to its normal or neutral position. The hammer head 19 is adjustable on the rod 18 by a set screw 20 or otherwise.

The cylindrical portion of the hammer head is provided with a lug or projection 27, arranged to be engaged by the cogs of a cog wheel 28 mounted upon the shaft 29, which in turn is supported in suitable bearings 20 from the frame work 11. This cog wheel is driven by suitable sprocket wheel 31, which, in turn, is connected with the sprocket wheel 33, by means of the chain 32. The sprocket wheel 33 upon the shaft 4 is in turn driven from the shaft 3 by means of the endless link chain or belt, and the shaft 3 is driven by a pulley 34 or in any other suitable manner. The arrangement of the cog wheel 28 is such that, as the cog wheel is rotated, the lug or projection 27 upon the hammer head will be successively engaged, and the hammer head will be thereby raised. As the cogs slip past the end of the lug or projection 27, the hammer head as a whole will be released and will fall to deliver its blow upon the nuts to be cracked. The number of cogs on the cog wheel 28 is the same as the number of spaces upon the sprocket wheels 5 and 6 carrying the endless chain belt and the cog wheel is connected to these sprocket wheels through sprockets 31 and 33 of equal diameter, so that the endless chain will move a distance equal to one link while the cog wheel is rotating through an angle represented by the distance from one cog to the next. The arrangement of the hammer head and of the moving endless belt carrying the anvils 8 is such that as each anvil with a nut thereon is brought under the raised hammer head, the hammer head will be released and will fall and deliver its cracking blow upon the nut.

The power hammer in descending has a check gear which is capable of being adjusted to the size of the material being treated, within a fraction of an inch. The cogs 28 of the cog wheel will thus serve to check the downward movement of the hammer head or of the cylindrical portion thereof, as the next successive cog is moved upwardly into contact with the projection 27, or as this projection in falling reaches the next lower cog; but it will be evident that other suitable check means (not shown) may be provided for arresting the downward movement of the hammer head or of the cylindrical portion thereof, in an adjustable manner and at the desired point.

The arrangement of the rod 18 which carries the main hammer head 19 is such that, when the hammer head as a whole falls, and the main hammer head 19 reaches the nut and is thereby arrested, the cylindrical portion of the hammer head with its sides and cross arms, tends to continue in its downward movement, with the result that the rod 18 and the main hammer head 19 are given a twist or half twist which promotes the cracking operation and the separation of the cracked shells from the kernels.

In order to promote this cracking operation the anvil 8 has a cup-shaped depression, which is not smooth but ridged inside, with ridges of about one-sixteenth inch depth and having sharp steel edges so that the nuts are held thereby against rotation, and so that nuts of different sizes and shapes will be effectively held. The striking head 19 of the hammer also has a cup-shaped depression which is likewise provided with ridges or corrugations which assist in the cracking operation and which particularly assist in the twisting action. Thus, after the striking head of the hammer has been brought down upon the nut and has delivered its first blow and after these ridges of the cup-shaped depression have been forced into or against the shell of the nut, the further twist given to the hammer head by the downward movement of the cylindrical members 16 and 17 relative thereto, will cause these projections to twist the upper portion of the shell relative to the lower portion, which will be held from rotation by the similar ridges of the depression in the anvil.

It will be evident that the springs 23 and 26 may be of lighter or heavier weight and may be adjusted as to their tension and resistance to compression, and that the screw or worm between the cylindrical member 16 and the rod 18 may likewise be varied as to its pitch so that the hammer blow given to the nut, and the twisting effect imparted thereto, will be adjusted for the particular work which the machine is called upon to do.

When the apparatus is properly adjusted for the material to be cracked, each nut will receive a blow sufficient to crack it, and, at the same time, the half twist of the hammer head will definitely free the kernel from the cracked nut shell. The cracked shell will then fall off the anvil into a suitable hopper, or will be discharged therefrom as the anvil passes over the sprocket wheel 5.

The cracked nuts that fall from the anvil may be collected in suitable hoppers and subjected to a suitable sizing operation for the separation of the kernels from the shells. A suitable collecting hopper for the shells and kernels is indicated conventionally at 35.

It is advantageous to subject the nuts coming to the cracking machine to a preliminary sizing, so that nuts of substantially the same size will be acted upon until nuts of that particular size have been used up. If then a smaller size or a larger size of nuts are to be cracked the apparatus can be adjusted to that particular size, for example, by raising or lowering the hammer head 19 upon its supporting rod 18.

While the apparatus of the present invention is adapted for the cracking of nuts still containing their outer shell or husk, which may be more or less rotten and sticky, nevertheless, it will usually be advisable to subjects the nuts to a preliminary treatment for the removal of this outer shell or husk, so that the clean nuts freed therefrom will be subjected to the cracking operation. Contamination of the kernels by the outer husks or shells is thereby prevented, and the inner shells are made available in a purer and more valuable form for certain purposes, for example, in making fine charcoal.

The apparatus of the present invention is of simple and rugged construction and can be operated without requiring the attention of an expert, or without requiring to be shut down frequently and for long periods for repairs, alterations, etc. The only attention which the apparatus needs in operation is that of an attendant to supply the nuts to the successive anvils as these are progressively brought in a position to receive the nuts and to convey them to the proper position under the striking head of the hammer. The endless link belt is moved relatively slowly; for example, at such a rate that about fifty nuts per minute are brought under the striking head of the hammer, so that one attendant can readily supply the necessary nuts therefor.

The apparatus of the present invention is of such a size and construction that it can be readily transported from one place to another, and can be mounted upon a truck or car for transportation or for use; and a series of endless belts can likewise be mounted on the same shaft and transported at the same time. The apparatus is particularly adapted for use where the cohune nuts themselves occur, inasmuch as it enables the nuts to be rapidly and continuously cracked and shelled and inasmuch as it furnishes the meat in a substantially uncracked and uninjured condition, readily adapted for treatment for the recovery of the oil therefrom and better adapted for shipment than injured or cracked meats or kernels.

It will be evident that variations and modifications can be made in the specific construction of the apparatus illustrated and described, without departing from the spirit and scope of the invention.

I claim:

1. The method of cracking cohune nuts and the like, which comprises subjecting the nuts while held from rotation to a combined blow and twist for the cracking of the shell and the removal of the shell from the kernel; substantially as described.

2. The method of cracking cohune nuts and the like, which comprises subjecting the nuts to a hammer blow and thereafter subjecting the hammer head to a twisting action, whereby the nut shell is given a combined blow and twist; substantially as described.

3. The method of cracking cohune nuts and the like, which comprises feeding the nuts successively under a cracking hammer head, holding the nuts from rotation while being so fed, and subjecting the nuts successively to a blow of such hammer head, the said blow being combined with a twist of the hammer head for promoting the separation of the shells from the kernels; substantially as described.

4. A machine for cracking cohune nuts and the like, comprising means for feeding the nuts to be cracked beneath a striking head and means for giving such nuts a blow, together with a twist, whereby the shells are cracked and separated from the kernels; substantially as described.

5. A machine for cracking cohune nuts and the like, comprising an anvil having means for holding a nut against rotation, a hammer head arranged thereabove for giving to the nut so held a cracking blow, and means for giving a twist to said hammer head and nut at the time of the cracking blow; substantially as described.

6. A machine for cracking cohune nuts and the like, comprising an endless chain carrying a series of anvils having nut-holding openings therein, means for moving said endless chain and for bringing the anvils successively under a cracking hammer, a cracking hammer arranged to deliver a cracking blow upon said nuts as they are successively brought thereunder, and means for giving to said hammer head a twist at the time of said cracking blow; substantially as described.

7. A machine for cracking nuts comprising means for feeding the nuts successively under a cracking hammer head, a hammer arranged to deliver a cracking blow upon the nuts, said hammer comprising a vertically movable portion and a hammer head carried and yieldably supported thereby in such a manner that it is capable of relative longitudinal and rotational motion, the parts of said hammer head being so constructed and arranged that when the hammer head strikes the nut it will be given a twist whereby the cracking of the nut is promoted; substantially as described.

8. A machine for cracking cohune nuts and the like, comprising an endless chain carrying a series of anvils having nut-holding openings therein, means for moving said endless chain and for bringing the anvils successively under a cracking hammer, a cracking hammer arranged to deliver a cracking blow upon said nuts as they are successively brought thereunder, said hammer comprising an outer cylindrical portion with a projecting lug thereon, a rod within said cylindrical portion carrying the hammer head at its lower end, a screw worm and springs arranged between the cylindrical portion and the rod whereby the rod is yieldably supported and helically movable with respect to the cylindrical portion, and a cog wheel having cogs arranged to engage with the projecting lug on the cylindrical portion and to raise the same and permit the same to fall periodically, whereby the hammer head is given a twist when it is permitted to drop and strike the nut and the cracking operation thereby promoted.

9. In a machine for cracking nuts, nut holding means, a hammer, and mounting means for said hammer so designed that the resistance offered by the nut upon being struck by the hammer, causes the hammer to twist.

In testimony whereof I affix my signature.

FREDERIC A. G. PAPE.